US012162177B2

(12) United States Patent
Schmeiser

(10) Patent No.: US 12,162,177 B2
(45) Date of Patent: Dec. 10, 2024

(54) CUTTING FOOD PRODUCTS

(71) Applicant: TEXTOR Maschinenbau GmbH, Wolfertschwenden (DE)

(72) Inventor: Jörg Schmeiser, Wiggensbach (DE)

(73) Assignee: TEXTOR Maschinenbau GmbH, Wolfertschwenden (DE)

( * ) Notice: Subject to any disclaimer, the term of this patent is extended or adjusted under 35 U.S.C. 154(b) by 183 days.

(21) Appl. No.: 16/072,378

(22) PCT Filed: Jan. 27, 2017

(86) PCT No.: PCT/EP2017/051754
§ 371 (c)(1),
(2) Date: Oct. 24, 2018

(87) PCT Pub. No.: WO2017/133977
PCT Pub. Date: Aug. 10, 2017

(65) Prior Publication Data

US 2019/0152084 A1 May 23, 2019

(30) Foreign Application Priority Data

Feb. 1, 2016 (DE) ......................... 102016101753.1

(51) Int. Cl.
*B26D 5/34* (2006.01)
*B26D 5/00* (2006.01)
*B26D 5/32* (2006.01)

(52) U.S. Cl.
CPC ............... *B26D 5/34* (2013.01); *B26D 5/007* (2013.01); *B26D 5/32* (2013.01); *B26D 2210/02* (2013.01)

(58) Field of Classification Search
CPC . B26D 5/00; B26D 5/007; B26D 5/30; B26D 5/34; B26D 5/36; B26D 7/06; B26D 7/0608; B26D 7/0616
See application file for complete search history.

(56) References Cited

U.S. PATENT DOCUMENTS 3,776,073 A * 12/1973 Runge .................. B26D 7/0608 83/47
4,065,911 A * 1/1978 Fagan ...................... B26D 7/30 177/121

(Continued)

FOREIGN PATENT DOCUMENTS

DE 19604254 A 8/1997
DE 19820058 A1 12/1999

(Continued)

OTHER PUBLICATIONS

Official Communication from the European Patent Office for related European Patent Application No. 17701708.4; dated: Oct. 24, 2019; 11 pages.

(Continued)

*Primary Examiner* — Adam J Eiseman
*Assistant Examiner* — Richard D Crosby, Jr.
(74) *Attorney, Agent, or Firm* — Erise IP, P.A.

(57) ABSTRACT

The invention relates to an apparatus for slicing food products, in particular to a high-performance slicer, having a working region which includes a cutting region and a transport region having a product feed, wherein the product feed supplies products to be sliced to the cutting region on one track or on multiple tracks and a cutting blade moves, in particular in a rotating and/or revolving manner, in a cutting plane at the end of the cutting region; and having a contactlessly working scanning device for detecting at least some of the outer contour of the products to be sliced, wherein the scanning device includes at least one compact sensor arranged in the working region for contour detection.

19 Claims, 1 Drawing Sheet

(56) References Cited

Figures 1, 2, 3, 4, 5:
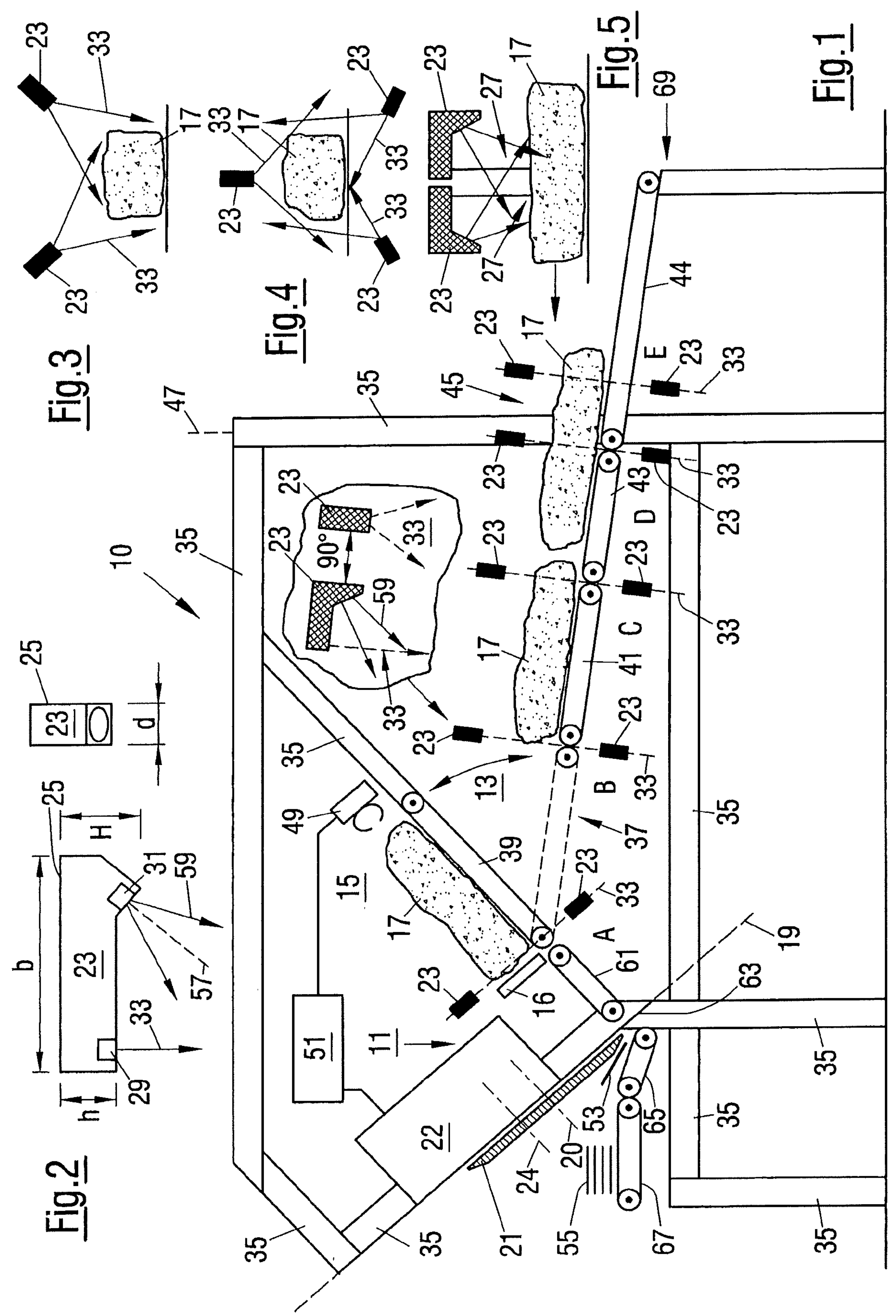

U.S. PATENT DOCUMENTS 4,208,933 A 6/1980 Skidmore
4,216,689 A * 8/1980 Suhling .................... B26D 7/32 83/77
4,368,657 A * 1/1983 Pellaton ................... B26D 1/29 83/592
4,532,840 A * 8/1985 Antonissen .............. B26D 7/30 83/88
4,543,868 A * 10/1985 Maurer .................... B26D 7/01 83/713
4,875,254 A * 10/1989 Rudy ................... A22C 17/002 452/157
5,109,936 A * 5/1992 Ruppel .................... B26D 7/30 177/25.19
5,429,024 A * 7/1995 Shimizu ................... B26D 5/38 83/268
5,937,080 A * 8/1999 Vogeley, Jr. ............. B26D 7/30 382/110
6,563,904 B2 * 5/2003 Wijts ................. A22C 17/0086 378/58
6,882,434 B1 * 4/2005 Sandberg ........... A22C 17/0033 250/223 R
7,055,419 B2 * 6/2006 Sandberg ................. B26D 7/30 83/77
7,153,203 B2 * 12/2006 Pfarr .................. B23K 26/0838 452/150
7,621,806 B2 * 11/2009 Bottemiller .......... A22C 17/008 452/150
8,373,749 B2 * 2/2013 Burton ................. A22C 17/008 348/89
9,180,990 B2 * 11/2015 Rother .................... B65B 43/14
9,597,812 B2 * 3/2017 Schmeiser ............. B26D 7/025
9,983,572 B2 * 5/2018 Pfarr ........................ B26D 5/20
10,843,362 B2 * 11/2020 Grasselli ............ A22C 17/0086
10,869,489 B2 * 12/2020 Blaine .................... B26D 5/007
2003/0145699 A1 * 8/2003 Kim ......................... B26D 3/10 83/13
2003/0205120 A1 * 11/2003 Thiedig .............. G01B 11/2433 83/35
2004/0194605 A1 * 10/2004 Weber .................... B26D 5/007 83/663
2004/0200365 A1 * 10/2004 Young ................ A22C 17/0033 99/537
2005/0120844 A1 * 6/2005 Weber ...................... B26D 5/34 83/35
2006/0150662 A1 * 7/2006 Lee ......................... F25D 29/00 62/441
2006/0156878 A1 * 7/2006 Faires .................... B65G 47/31 83/13
2007/0157776 A1 * 7/2007 Sorensen ........... A22C 17/0086 83/23
2007/0214923 A1 * 9/2007 Maier .................... B26D 5/007 83/37
2008/0250945 A1 * 10/2008 Seager ..................... B26D 5/32 99/537
2009/0120256 A1 * 5/2009 Pasek ....................... B26D 5/34 83/446
2011/0154969 A1 * 6/2011 Weber ................ A22C 17/0086 83/520
2011/0185868 A1 * 8/2011 Schmidt ................... B26D 1/46 83/77
2011/0265492 A1 * 11/2011 Newman ............... F25D 29/001 62/1
2011/0296964 A1 * 12/2011 Muller ..................... B26D 7/08 83/23
2012/0073415 A1 * 3/2012 Maidel ................... B26D 1/143 426/531
2012/0089244 A1 * 4/2012 Weber ...................... B26D 5/32 700/103
2012/0097002 A1 * 4/2012 Thiedig .............. G01B 11/2522 83/365
2012/0198974 A1 * 8/2012 Weber .................... B26D 5/007 83/13
2013/0074667 A1 * 3/2013 Weber .................... B25J 9/1697 83/73
2013/0104380 A1 * 5/2013 Felber ...................... B26D 7/06 29/557
2013/0118326 A1 * 5/2013 Ascari .................... B26D 3/185 83/79
2013/0133490 A1 * 5/2013 Schmeiser ........... G01N 23/083 83/39
2013/0167700 A1 * 7/2013 Weber ...................... B26D 7/01 83/409.1
2013/0319196 A1 * 12/2013 Schmeiser ............... B26D 5/00 83/34
2015/0224667 A1 * 8/2015 Weber ................. B26D 7/0625 83/23
2015/0321372 A1 * 11/2015 Fox ...................... B26D 7/0625 53/514
2016/0031110 A1 * 2/2016 Middleton ....... G05B 19/41815 83/13
2016/0271822 A1 * 9/2016 Burk ........................ B26D 5/00
2017/0113368 A1 * 4/2017 Schmeiser ........... B26D 7/0683
2017/0312931 A1 * 11/2017 Volkl ..................... A22C 25/18
2018/0027848 A1 * 2/2018 Blaine .................... A22B 5/007
2018/0158537 A1 * 6/2018 Blaine .................... G12B 13/00
2019/0240857 A1 8/2019 Mayer et al.

FOREIGN PATENT DOCUMENTS

DE 102004030777 A1 1/2006
DE 202007009722 U1 9/2007
DE 102007021510 A1 11/2008
DE 202009009048 U1 12/2010
DE 102009036682 A1 2/2011
DE 102011114180 A 3/2013
DE 102012214741 A1 2/2014
DE 102013103253 A1 10/2014
DE 102013207401 A1 10/2014
DE 102015003632 A1 * 3/2015 ........... B26D 7/0625
EP 2341313 A1 7/2011
EP 2420363 A1 2/2012
EP 2444213 A1 4/2012
EP 2644337 A1 10/2013
EP 2865988 A1 4/2015
GB 2264602 A 9/1993
GB 2377362 A 1/2003
WO 2000062983 A1 10/2000
WO 2004106020 A1 12/2004
WO 2005051086 A1 6/2005
WO 2006136818 A1 12/2006

OTHER PUBLICATIONS

Communication from European Patent Office for related European Application No. PCT/EP2017/051754; 7 pages.
Communication from German Patent Office for related German Application No. 102016101753.1; 2 pages.
OptoNCDT Laser-Wegsensoren (Triangulation) with English Equivalent; 12 pages.
EP Search Report for related European Application No. 21175748.9; dated: Sep. 23, 2021; 7 pages.
EP Search Report for related European Application No. 21175757.0; dated: Aug. 19, 2021; 7 pages.
Notification of an Objection mailed Jun. 23, 2022 for European Application No. 17701708.4, 106 pages.
Technical description of "SmartRay 5600," SmartRay GmbH, printed Jul. 2014, 48 pages.
"ECCO" description from the SmartRay GmbH website, obtained Dec. 26, 2014, https://web.archive.org/web/20141226011458/http://www.smartray.de/, 1 page.
Technical drawing for "SmartRay 5600," SmartRay GmbH, obtained Apr. 2014, https://www.smartray.com%2FDOWNLOADS%2FDimensional-Drawing%2FSR5650dimensional_description.PDF, 1 page.
Invoices and Delivery Notes from 2015 for "SR 5600," 10 pages.
Sales Confirmation for the "SmartRay 5600," 2022, 1 page.
Manual for "M2-iLan Laser Scanner," MEL Mikroelektronik GmbH, printed Sep. 2010, 38 pages.

(56) References Cited

OTHER PUBLICATIONS

Excerpt from the MEL Mikroelektronik GmbH website of M2-iLAN Laser-Scanner, obtained May 27, 2009, https://web.archive.org/web/20090527082548/http://www.melsensor.de/laser-scannerd/m2-ilan-scanner.html, 1 page.
Excerpt from the MEL Mikroelektronik GmbH website of M2-iLAN Laser-Scanner, obtained Jun. 12, 2015, https://web.archive.org/web/20150612222823/http://www.melsensor.de/laser-scannerm2-ilan.html, 1 page.
Confirmation Letter from Firma Wenglor Sensarie GmbH, formerly MEL Mikroelektronik GmbH, regarding the proof of sensor manual, Jun. 2022, 1 page.
HR Excerpt from Firma Wenglor Sensarie GmbH, Jun. 2022, 2 pages.
European Patent Application No. 21175757.0, Examination Report issued Feb. 28, 2024.

* cited by examiner

CUTTING FOOD PRODUCTS

CROSS-REFERENCES TO RELATED APPLICATIONS

This application is a 371 National Phase Application of Patent Application PCT/EP2017/051754, filed on Jan. 27, 2017, which claims the priority of German Application No. 102016101753.1 filed on Feb. 1, 2016, each of which is incorporated herein by reference, in its entirety.

The invention relates to an apparatus for slicing food products, in particular to a high-performance slicer, having a working region which comprises a cutting region and a transport region having a product feed, wherein the product feed supplies products to be sliced to the cutting region on one track or on multiple tracks and a cutting blade moves, in particular in a rotating and/or revolving manner, in a cutting plane at the end of the cutting region.

Such slicing apparatus which are also simply called slicers are generally known. For example, slices are cut off from the food products at a constant cutting frequency using circular blades which revolve in a planetary motion and additionally rotate or using scythe-like blades which only rotate and which have speeds of several hundred up to some thousand revolutions per minute. In practice, it is desirable in many applications that either the individual slices or portions formed from a plurality of slices have a predefined weight. Since the cutting frequency is constant, the weight of the individual slices is preferably influenced in that the thickness of the slices is varied. This takes place by a corresponding control of the product feed: the further the product between two consecutive cuts of the blade is advanced beyond the cutting plane, the greater the thickness of the product slice subsequently cut off. In this respect, the slice thickness is only one parameter which determines the weight of the respective slice. The slice weight is determined by the slice volume and by the average density of the slice, with the slice volume resulting from the slice thickness and the outer surface contour of the slice. The average density of the product can be determined from the total weight of the product determined by means of a scale before the slicing and from the total volume of the product determined by the outer surface contour of the total product.

If product slices or portions of product slices of constant weight should be obtained, knowledge of the outer contour of the products to be sliced is therefore necessary for this purpose. The contour is also called a profile.

The above-explained connections and so-called product scanners which serve to detect the outer contour of food products to be sliced are generally known to the skilled person. Reference is made purely by way of example to DE 196 04 254 A, WO 2000/062983 A, EP 2 644 337 A and DE 10 2009 036 682 A.

In practice, product scanners are as a rule separate machines which are each positioned in front of the slicer as components of a total production line. The products in this respect pass through a tunnel-like scan housing in which the outer product contour is detected by scanning. The electric and electronic or optoelectronic devices used for the scanning are in this respect arranged within the scan housing in a comparatively open and unprotected manner. This is possible since laser radiation of a higher protection class can also be used due to the surrounding scan housing. In addition, it is not necessary to subject the interior of the scan housing to a high-pressure cleaning or steam-jet cleaning so that the electric or electronic devices do not have to satisfy particularly high demands on the type of protection or protection class.

The high additional costs and the increased space requirement are disadvantages of the product scanners previously used in practice since a product scanner configured as a separate machine requires a comparatively large amount of space and in particular considerably increases the length of a production plant.

Depending on the product, a longer transport and handling path between a separate, upstream product scanner and the cutting region is moreover unfavorable since the product may be changed in an unwanted manner with respect to its outer dimensions, i.e. its outer contour, on its way to the cutting region. This can e.g. take place by a mechanical influence or in that temperature influences have an effect.

It is the object of the invention to provide a simple, reliable, cost-favorable and space-saving possibility of determining the outer contour of food products to be sliced.

In accordance with the invention, the slicing apparatus comprises a contactlessly working scanning device for detecting at least some of the outer contour of the products to be sliced, wherein the scanning device comprises at least one compact sensor arranged in the working region for contour detection.

The invention means a fundamental moving away from the previous procedure which comprises using large and expensive product scanners in the form of separate machines for the contour detection and positioning them in front of the slicing apparatus. The invention makes use of the recognition that contour detection is possible using compact sensors which can be arranged in the working region of the slicing apparatus itself, that is within the slicer. The prejudice prevalent in the prior art is thus overcome according to which a contactless contour detection of food products to be sliced is not possible under the conditions which are provided in the transport region and in the cutting region of a high-speed food slicer, that is under conditions which are in particular characterized by the presence of dirt, heat and moisture. This is due to the fact that cutting residues, cutting dust and cutting flour are present in the region of a food slicer and all the components of a food slicer regularly have to be subjected to cleaning with water or with steam under high pressure and at high temperatures. In addition, it plays a role that care has to be taken that safety provisions are maintained and in particular eye safety is ensured for the operators in the event of the use of laser radiation for contour detection.

It was surprisingly found that sensors which are very small and compact in comparison with the dimensions of a typical food slicer can be provided; they enable a reliable contour detection with a sufficiently high accuracy and can simultaneously be designed robust enough to be able to resist conditions within the working region of a food slicer which are adverse for electric or optoelectronic devices.

Possible embodiments of the compact sensors used in accordance with the invention and advantageous properties of these compact sensors are explained in the following and are set forth in the dependent claims.

Such a compact sensor can comprise, in a common housing, a laser for transmitting laser radiation in a scanning plane as the light source and a camera which can record the image of a line which is produced by the transmitted radiation on a product to be scanned in the scanning plane. Such sensors can have an integrated electronics system without the necessity for an additional controller. Furthermore, such sensors can be insensitive with respect to external light or scattered light. Very high resolutions in the range of some hundredths of a millimeter or very high data output rates or signal output rates of up to 6 kHz are furthermore possible. The sensors can be provided with an integrated gigabit LAN port.

Such compact sensors consequently form so-to-say autonomous units which only have to be connected to a power supply and to a data detection device.

In a possible embodiment, such a compact sensor has a width of approximately 300 mm, a maximum height of approximately 100 mm and a thickness of approximately 40 mm. Such sensors are available from the company wenglorMEL GmbH, for example.

The housing of these sensors can be improved such that the sensors satisfy high device protection classes and are absolutely insensitive with respect to dust and with respect to cleaning with water and steam under high pressure and at high temperatures.

A further advantage of such sensors is that they can be operated using laser radiation of a lower protection class and are thus not dangerous to the human eye.

Such compact sensors can consequently be positioned in a free and open manner at any desired position in the working region of a food slicer. Due to their small construction size, the compact sensors require little space and can thus be variably placed in dependence on the respective construction circumstances of the slicer and on the contour of the products which is to be scanned. A plurality of compact sensors can be arranged independently of one another in the slicer. The detection data of a plurality of sensors can be combined by calculation within the framework of the data evaluation.

In accordance with the invention, the compact sensors preferably work in accordance with the so-called light sectioning process to detect a contour or a profile. This measurement principle is generally known to the skilled person. For this purpose, reference is also made to the initially mentioned patent literature with respect to the prior art. Generally, other scanning principles such as time-of-flight measurements can also be used in accordance with the invention. On the use of the light sectioning process, the production of the continuous lines or interrupted lines on the products to be scanned can generally take place in any desired manner. Thus a light line can, for example, be transmitted by means of a line laser and, optionally, using suitable optics such as a cylindrical lens. Alternatively, a single laser beam can be periodically deflected at a high scanning rate within a scanning angular range.

The invention additionally relates to a method of detecting at least some of the outer contour of food products to be sliced by means of a slicing apparatus, in particular by means of a slicing apparatus of the kind described herein, wherein the contour is detected within the slicing apparatus by means of a contactlessly working compact sensor of a scanning device.

The invention furthermore relates to the use of at least one compact sensor which is arranged in the working region of a slicing apparatus of the kind described herein for the carrying out of one or more additional tasks by detecting at least one contour belonging to at least one functional unit of the apparatus.

Preferred embodiments of the invention are described above and below and result from the drawing, the associated description and the claims.

The compact sensor is preferably arranged in a separate self-contained sensor housing, wherein the compact sensor defines a scanning region for the products, which is disposed outside the sensor housing, within the working region of the slicing apparatus. Whereas in accordance with the previous practice—as already mentioned above—the products have to pass through the scanner housing, provision is so-to-say made in accordance with the invention that the scanner has to be based on the products and on the manner of their handling in the slicer and in particular of their transport path through the slicer. Such an integration into the slicer is possible without a problem due to the compactness and the general insensitivity of the sensors in accordance with the invention.

The sensor housing can be configured such that it satisfies a national or international standardized protection class in accordance with which dust-proofness, complete protection against contact and protection against water are provided during high-pressure cleaning/steam-jet cleaning, in particular protection class IP6K9K or IP69 in accordance with DIN 40 050, part 9, or DIN EN 60529, or an equivalent protection class.

An encapsulated compact sensor or a compact sensor having an encapsulated sensor housing can in particular be provided.

The compact sensor preferably comprises a transmitter for transmitting scanning radiation into a scanning region and a receiver for receiving radiation from the scanning region, with the transmitter and the receiver being arranged in a common sensor housing of the compact sensor. In this respect, the scanning region in particular presents that spatial volume in which the transmission region of the transmitter and the reception region of the receiver overlap.

Provision is preferably made that the compact sensor transmits laser radiation and is configured such that it satisfies a national or international standardized laser protection class in accordance with which the laser radiation is not dangerous to the human eye, in particular laser protection class 1 or 2 in accordance with DIN EN 60825-1, or an equivalent laser protection class.

The compact sensor is in particular configured to transmit scanning radiation in a scanning plane. This scanning radiation produces a line on a product to be scanned, said line being able to be detected by means of a receiver and being able to be evaluated with respect to its extent to determine the product contour in the scanning plane, with the optical axis of the receiver being inclined with respect to the scanning plane, i.e. the receiver "looks", at an angle to the scanning plane, at the line produced on the product surface.

Provision is preferably made that a scanning plane of the compact sensor extends at least substantially perpendicular to or at an angle of more than approximately 45° to a direction of movement of the products through the scanning plane.

The compact sensor is preferably configured as a laser scanner. Both such sensors in which a continuous line or an interrupted line is transmitted and sensors in which a point-like laser beam is transmitted and periodically deflected are called scanners here.

The compact sensor preferably works in accordance with the light sectioning process. As already mentioned, such a scanning principle is generally known for contour or profile detection.

The compact sensor is preferably configured to produce a continuous line or an interrupted line, by means of a light source, in particular a laser source, on a product to be scanned and to record an image including the line by means of a camera. A photodiode or a CCD device can serve as a camera, for example.

The compact sensor is preferably supported or held at a support frame or a rack of the slicing apparatus by which the cutting region and the transport region of the slicing apparatus are also supported. The compact sensor in accordance with the invention can be positioned in the working region in generally any desired manner in particular due to its comparatively low weight. Comparatively light and filigree holders or suspensions for the compact sensor can be used. The compact sensor can, for example, also be fastened to already present components of the slicing apparatus.

The compact sensor can be arranged in or at the cutting region. It is also possible to arrange the compact sensor in the region of the product feed. The compact sensor can in particular be arranged in the region of a front product abutment of the product feed. A possible spacing of the compact sensor from a front abutment plane of the product abutment amounts to approximately 5 to 20 mm, for example. In a possible embodiment, the compact sensor is located at a spacing of approximately 30 to 400 mm from the cutting plane—viewed in the supply direction of the products.

If the positioning or orientation of the compact sensor is spoken of, the position or orientation of a scanning plane of the sensor is in particular also to be understood by this.

Alternatively to the aforesaid possibilities, the compact sensor can be arranged in a region of the transport region which is positioned in front of the product feed.

The compact sensor can, for example, be arranged in the region of a transfer device, the products being transferred to the product feed by means of said transfer device. The transfer device can have a pivotable product support, wherein the compact sensor is arranged in front of the pivotable product support—viewed in a transport direction of the products.

In an embodiment, the compact sensor can be arranged in the region of a transition between two conveying devices of a transport path of the transport region. If the compact sensor is arranged beneath the transport path, an intermediate space between two consecutive belt conveyors can, for example, be used for scanning the products from below.

Provision can furthermore be made that the compact sensor is arranged in a product inlet region of the apparatus, in particular in, directly in front of or directly behind an inlet plane defined by a support frame or a rack of the apparatus.

Since the compact sensor can generally be freely placed in the slicing apparatus due to its small size, it can be ensured in accordance with an embodiment that the compact sensor is arranged outside a contamination region of the working region. Cleaning of the slicing apparatus is not hereby made unnecessarily more difficult. Provision can in particular be made that the compact sensor is arranged spaced apart from the product and/or from the product feed.

Provision can furthermore be made in accordance with the invention that different scanning positions are predefined for the compact sensor in the working region. On the one hand, it is meant hereby that the contour detection of the products in the slicing apparatus can generally take place at different scanning points. Examples of different scanning points were named above. On the other hand, provision can in particular, however, also be made that the different scanning positions belong to a common scanning point. This means that, on a change of the scanning position of the compact sensor, the scanning point at which the contour detection at the products within the slicing apparatus takes place is not changed, but merely the position of the compact sensor can be changed at the scanning point. For example, the compact sensor can be moved somewhat further to the front or somewhat further to the rear—viewed in the direction of movement of the products. Alternatively or additionally, the angular position of the compact sensor can be changed around the direction of movement. In this manner, the contour detection can, for example, in particular be optimized in dependence on the type or the property of the respective products in that the geometrical relationships of the scanning are optimized by a different positioning of the compact sensor. The scanning device in accordance with the invention can hereby also flexibly react to conversions or retrofittings of the slicing apparatus which change its construction conditions.

In cases in which the slicing apparatus itself is not converted or changed itself or is only converted or changed insignificantly and at least substantially only a change of the kind or type of product takes place, it is also possible to respond quickly and reliably to such a change by a product-dependent adaptation or adjustment or a product-dependent conversion of the compact sensor.

The different scanning positions are in particular unambiguously predefined such that the compact sensor can only be placed in a single position and orientation. No alignment processes or teaching processes are hereby necessary on a new positioning of the compact sensor.

Provision can in particular be made that the compact sensor can be adjusted and/or can be converted between the scanning positions. The compact sensor can, for example, be pivoted or displaced, wherein compulsory guides and end abutments can, for example, be provided for this purpose to establish an advantageous unambiguity of the positioning of the compact sensor.

In accordance with a further embodiment of the invention, provision is made that a plurality of parallel product tracks of the slicing apparatus are simultaneously covered by one or more compact sensors. It is thus not necessary to provide a separate compact sensor for each product on a multitrack operation of the slicing apparatus. The number of compact sensors can therefore be smaller than the number of tracks, wherein it is possible, but not absolutely necessary, that all the tracks are detected by a single compact sensor. It has been found that a sufficiently large scanning region of the compact sensor can be provided without having to accept impairments in particular with respect to the positionability of the compact sensor within the slicing apparatus. The track association can e.g. take place by filtering the respective desired signal in an associated control device.

In accordance with a further embodiment of the invention, provision is made that a plurality of compact sensors for a joint contour detection are arranged at a scanning point. A plurality of compact sensors which cooperate on the contour detection can therefore be arranged at a scanning point. In dependence on the outer design of the products to be sliced, a single compact sensor per scanning point can be sufficient to detect the product contour with the accuracy sufficient for the respective invention. It can be advantageous in other applications to use a plurality of compact sensors per scanning point. They can be arranged distributed around the direction of movement or transport direction of the products in the peripheral direction. Two compact sensors which each scan the product obliquely from above can thus be provided, for example. Alternatively, a single compact sensor supported by two compact sensors, which scan obliquely from below and are arranged beneath the products, can be provided above the products.

If the compact sensors work with scanning planes, it is possible, but not absolutely necessary, in accordance with the invention that all the scanning planes of the compact sensors are disposed in a single common plane. It is rather possible that the scanning planes are slightly offset with respect to one another in the transport direction of the products. The setting up of a scanning point is hereby substantially simplified since no complex and/or expensive alignments of the compact sensors relative to one another are necessary. It has been found in connection with compact sensors working in accordance with the light sectioning process that a spacing of the scanning lines at a product of only a few millimeters still enables a reliable detection and evaluation of the scanning lines by the associated compact sensor. In other words, it has been found that the compact sensors do not interfere with one another.

The aforesaid example is a possibility for a general preferred concept of the invention according to which the scanning of the products can take place in a manner offset in space by at least two compact sensors at a scanning point. Alternatively or additionally to a spatial offset, it is possible to carry out a scanning offset in time in that the compact sensors are not simultaneously active, but rather alternately active. It can thus, for example, be prevented by a pulsed operation in compact sensors working in accordance with the light sectioning process that the camera of the one sensor is interfered with by the scanning line produced on the product by the other sensor.

Provision can furthermore be made that the scanning takes place by two compact sensors oriented oppositely with respect to one another at a scanning point. In this manner, a point or a region at the outer side of a product can be detected from different directions. This is particularly advantageous in products having a very irregular shape since regions not to be detected are, for example, prevented due to undercuts or depressions.

In accordance with a further embodiment, provision can be made that the scanning device is configured to carry out one or more additional tasks. This can take place by detecting at least one contour belonging to at least one functional unit of the apparatus by means of the compact sensor. In this respect, the compact sensor can at least temporarily be used to scan a functional unit of the apparatus. If the compact sensor is arranged in the region of the product feed, a product gripper engaging at the rear product end during the advance of a product or a product holder of a different type can, for example, be scanned when it passes the scanning point of the compact sensor during the product advance. It can hereby, for example, be examined whether the product gripper or the product holder is correctly oriented and whether a residual product piece to be discarded in normal operation is still located at the product gripper or product holder if said product gripper or product holder is moved back into a starting position for the preparation of the slicing of a following product and again passes the scanning point in the process. It could e.g. also be examined by means of a compact sensor whether side abutments matching product parameters each set at the slicer are installed at all or whether present side abutments are respectively set to the correct position.

In general, due to the fact that the compact sensor is arranged within the slicing apparatus, it can consequently additionally be used to monitor a proper configuration and a proper functional sequence of one or more functional units of the slicing apparatus.

As already initially mentioned, the contour detection by means of one or more compact sensors within the slicing apparatus in particular serves to acquire product slices or portions of product slices of constant weight.

Against this background, a control device can be provided which is configured to calculate control data using detected product contours and to operate the apparatus, in particular the product feed, using the control data.

With regard to the method in accordance with the invention, the use of one or more compact sensors within the slicing apparatus makes it possible to adapt the contour detection to processes which anyway take place on the handling of the products within the slicing apparatus. A possible slicing apparatus can thus, for example, be operated such that a product transferred to the product feed can be reliably gripped by a product gripper engaging at the rear product end such that the product is pressed by means of the product gripper toward a product abutment temporarily located in the advance path. The product is subsequently retracted by a specific, comparatively short path by means of the product gripper which now grips correctly in a manner in accordance with its intended purpose, whereupon the product abutment is moved away to release the advance path to the cutting plane. The product is thereupon moved toward the cutting plane and then through the cutting plane by means of the product gripper. It can be problematic in this connection that the product pressed toward the product abutment is deformed during the gripping process, but does not completely relax again on the subsequent retraction. In dependence on the respective product type, a plastic deformation can consequently take place and a permanent deformation can thus occur, whereby the outer product contour changes during the gripping. This can result in errors on the control of the product advance when the control, due to an upstream scanning process, starts from an outer product contour which is no longer present at all after the gripping process due to a non-elastic deformation of the front product region.

In such a case, the invention can avoid errors in that the product contour is in each case only detected, and in particular only detected shortly before the slicing, after the product, which was previously compressed due to a gripping process in the product feed, has relaxed again, wherein it is not disadvantageous if the product only partly relaxes and a residual deformation remains. It is thus, for example, possible in accordance with the invention to arrange one or more compact sensors in the region of the mentioned product abutment. The contour detection can consequently take place on or shortly after the start of the actual product feed and thus of the actual slicing operation. The scanning of the product consequently in particular only starts when the product is advanced toward the cutting plane by means of the product holder.

It has been found that in many applications it is not necessary for a sufficient accuracy to only start with the slicing of a product after the product has been completely scanned. It is therefore possible that a middle section and/or a rear section of the product is/are only scanned when the slicing of the product has already begun.

Such a use of the scanning device in accordance with the invention also does not result in an impairment of the working speed of the slicing apparatus. It has been found that the quality and in particular the accuracy of the contour detection is not impaired if the product is scanned at different feed speeds in two scanning phases during the scanning process such as is the case when, after a gripping process, the product is first moved toward the cutting plane during a fast-feed phase and is subsequently moved through the cutting plane at a relatively slower feed speed in a cutting feed phase. A front product section is then scanned by means of the compact sensor at a relatively higher feed speed and the remaining product section is subsequently scanned by means of said compact sensor at a relatively slower feed speed. Consequently, the contour detection can here also take place on or shortly after the start of the actual product feed and thus of the actual slicing operation.

As already initially mentioned, provision can be made in accordance with an embodiment of the invention that control data are calculated using detected product contours and the slicing apparatus, in particular the product feed, is operated using the control data, and indeed for the purpose of acquiring product slices or portions of product slices of constant weight.

A possible embodiment of the method in accordance with the invention is characterized in that one or more additional tasks are carried out by means of the scanning device. Provision can be made for this purpose that at least one contour belonging to at least one functional unit of the apparatus is detected by means of the compact sensor.

The invention will be described in the following by way of example with reference to the drawing. There are shown:

FIG. 1 a food slicer in accordance with the invention in a schematic side view;

FIG. 2 two views of a compact sensor in accordance with the invention; and

FIGS. 3 to 5 schematically in each case, a possible arrangement of a plurality of compact sensors in accordance with the invention.

In accordance with FIG. 1, a food slicer 10 in accordance with the invention has a frame-like rack 35, comprising a plurality of supporting struts and bars, as a supporting structure in a manner known per se. The working region of the slicer 10 largely disposed within this support frame 35 comprises a front cutting region 11 and a transport region 13 having a product feed 15.

The cutting region 11 comprises a cutting head 22 which is supported at a frame rack 35 and in which a drive, not shown, for a cutting blade 21, configured as a circular blade here, is in particular arranged. The cutting plane 19 defined by the cutting blade 21 is inclined approximately by 45° to the vertical. The axis of rotation 20 of the cutting blade 21 is indicated by a dashed line. During operation, the cutting blade 21 rotates about its own axis of rotation 20 and additionally revolves about a drive axis 24 which is indicated by a chain-dotted line and with respect to which the cutting blade 21 is eccentrically arranged and thus revolves about in a planetary motion.

The product support comprises a support plane which extends perpendicular to the cutting plane 19, and which is thus likewise inclined by 45° to the vertical, and along which food products 17 to be sliced are supplied to the cutting plane 19 with the aid of a product holder 49 engaging at the rear product end.

A movable product abutment 16 is provided in front of the cutting region 11 beneath the blade head 22. As explained in the introductory part, the respective product 17 is pressed toward the product abutment 16 by means of the product holder 49 in a gripping process to ensure a reliable gripping of the product 17. If the actual product advance toward the cutting plane 19 is then started, the product abutment 16 is moved out of the movement path of the product 17 to release the path to the cutting plane 19.

In the representation of FIG. 1, the product 17 is disposed on a pivotable product support 39 of the product feed 15. The product support 39 belongs to a transfer device 37 which will be looked at in more detail in the following. The product support 39 can e.g. be configured as a free-running endless belt or can have a sliding surface for the products 17.

In the upwardly pivoted state in accordance with FIG. 1, the pivotable product support 39 forms a product support, on which the product 17 is disposed during the advance, together with a front conveyor 61 which can be a conveyor belt or a passive sliding support, for example.

A cutting edge 63 with which the cutting blade 21 cooperates on the cutting off of slices 53 from the products 17 adjoins the front conveyor 61. Portions 55 are formed on a portioning belt 65 from the cut-off slices 53 and are subsequently transferred to a further conveyor belt 67 and are then supplied to a further processing in which the portions 55 are in particular weighed. A scale can be integrated into the conveyor 67.

A central control device 51 is schematically shown in FIG. 1 and is inter alia connected to the cutting head 22 and to the product holder 49 of the product feed 15. In addition, the control device 51 communicates with the remaining functional units of the slicer 10, in particular with a scanning device which will be explained in more detail in the following and which comprises a plurality of compact sensors 23 for which four different scanning points A, B, C, D and E within the slicer 10 are indicated for illustration.

The slicer 10 can generally be configured for a single-track operation or for a multitrack transport, feed and slicing of food products 17. The product feed 15 then has a pivotable product support 39 and a product holder 49 for each track. The slicer 10 can in particular be configured for an operation completely individually per track in which the tracks can be operated completely independently of one another and share the common cutting blade 21.

The products 17 to be sliced are manually or automatically supplied in a loading region 69 onto a further conveying device 44 which can be considered as belonging to the transport region 13 of the slicer 10 and supplies the loaded products 17 through a rear product inlet region 45, which defines an inlet plane 47, to further conveying devices 41, 43 of the transport region 13. The transport path formed by the conveying devices 41, 43, 44, which can in particular be endless belt conveyors, increases slightly from the rear to the front so that the products 17 in front of the transfer device 37 are already located at a specific height within the slicer 10 and the loading height in the loading region 69 is thus comparatively low, whereby a manual loading is in particular facilitated.

To achieve portions 55 which are at least largely of constant weight, the product advance in the product feed 15 inter alia takes place on the basis of the cross-sectional surfaces of the products 17 which can be calculated from the outer product contour. The already mentioned contactlessly working scanning device is provided for the detection of the product contour and comprises an arrangement of compact sensors 23 at at least one scanning point within the slicer 10.

A possible scanning point A is located directly in front of the product abutment 16 in the product feed 15 which is inclined to the vertical and which thus extends perpendicular to the cutting plane 19. The compact sensors 23 are consequently arranged such that their scanning planes 33 extend in parallel with the cutting plane 19 and thus perpendicular to the longitudinal product extent and thus perpendicular to the product advance direction. The compact sensors 23 are here arranged such that their scanning planes 33 are disposed in a common plane. Alternatively, the scanning planes 33 of the compact sensors 23 can be offset from one another.

The individual compact sensors 23 are so small that they can so-to-say be considered as point-like in comparison with the dimensions of the slicer 10. The slicer 10, for example, has a length of approximately 2.70 m without the loading region 69, that is up to the inlet plane 47, a height of approximately 2.50 m up to the upper bars of the support frame 35 and a width of approximately 1 m. This means that sufficient space for an ideal positioning of the small compact sensors 23 is still present even in a comparatively compact construction of the slicer in which a plurality of functional units are integrated in a comparatively small space. As mentioned in the introductory part, the compact sensors 23 can consequently largely be freely positioned and, due to their low weight, can be fastened directly to existing functional units of the slicer 10 with a small mechanical effort or can be fastened via holders to these functional units or can be fastened to the support frame 35. Furthermore, a power supply and a signal line for a transmission of the detected contour data to the central control device 51 are respectively sufficient for the compact sensors 23. In principle, a wireless data transmission and a battery operation respectively a rechargeable battery operation of the compact sensors 23 are possible, which further simplifies the integration of said compact sensors into the slicer 10.

A further possible scanning point B is located in front of the transfer device 37 which, with a downwardly pivoted product support 39 indicated by dashed lines in FIG. 1, takes over the products 17 from the front conveying device 41 of the transport device supplying the products 17 over the "rear" of the slicer 10. The scanning planes 33 of the compact sensors 23 are disposed in the region of the transition between the conveying device 41 and the downwardly pivoted product support 39. The products 17 can consequently be scanned while they are transferred to the transfer device 37.

An alternative scanning point C is located in the region of the transition between the two consecutive conveying devices 41, 43 of the transport device.

The scanning point D shows a further possibility of positioning the compact sensors 23. The scanning planes 33 of the compact sensors 23 are located directly behind the inlet plane 47 of the slicer 10 and, in turn, in the transition region of two conveying devices 43, 44. The scanning point E shows yet a further positioning possibility. The compact sensors 23 are arranged directly in front of the product inlet region 45. In this case, the conveying path can be interrupted at this scanning point E, if necessary, and can e.g. comprise two consecutive conveyors.

In FIG. 1, the compact sensors 23 are only shown schematically at the respective scanning points A, B, C, D and E. The enlarged representation within FIG. 1 shows a side view at the left and, rotated by 90° with respect thereto, an end face view of a possible compact sensor 23 in accordance with the invention at the right to illustrate how the compact sensors 23 configured in accordance with this embodiment can be oriented in the slicer 10.

Reference is also made to FIG. 2 in this connection. The compact sensors 23 each comprise a self-contained sensor housing 25 in which a laser source 29 as the transmitter and a camera 31 as the receiver are respectively arranged. The laser source 29 transmits scanning radiation in a scanning plane 33 which—as already mentioned—extends perpendicular to the longitudinal extent in the slicer 10 and thus perpendicular to the respective direction of movement of the products 17.

A conical detection region 59 of the camera 31 comprising an optical axis 57 which extends inclined to the scanning plane 33 intersects the V-shaped scanning plane 33 at a distance from the sensor housing 25 predefined by the respective configuration of the compact sensor 23. This overlap region forms the scanning region 27 (cf. FIG. 5) of the compact sensor housing 25.

As already initially mentioned, the compact sensor 23 can have a width b of approximately 300 mm, a smaller height h of approximately 60 mm, a larger height H of approximately 80 mm and a thickness d of approximately 40 mm in accordance with a possible embodiment.

In this embodiment, the mentioned scanning region 27 (cf. FIG. 5), for instance, starts at a spacing from the housing 25 of the compact sensor 23 of approximately 300 mm measured along the scanning plane 33. The scanning region 27 ends approximately after a further 700 mm and thus only at a distance of approximately 1 m from the sensor housing 25. The width of the working region amounts to approximately 280 mm at the start, that is at a distance of approximately 300 mm, and amounts to approximately 830 mm at the end, that is at a distance of approximately 1000 mm. The mean spatial resolution amounts to between 45 and 200 μm—depending on the direction—within the scanning region. The laser source can be operated with a red laser (wavelength 660 nm) or with a blue laser (wavelength 405 nm).

FIGS. 3, 4 and 5 show possible relative arrangements of a plurality of compact sensors at a scanning point in a purely exemplary manner.

In accordance with FIG. 3, two compact sensors 23 are arranged above a product 17 and each scan the product 17 obliquely from above at approximately 45°. The scanning planes 33 each extend perpendicular to the direction of movement of the product 17 and are thus disposed in the plane of the drawing of FIG. 3. The scanning planes 33 overlap such that the upper side of the product 17 can simultaneously be illuminated from different directions and the side flanks of the product 17 can additionally be detected at least substantially completely.

FIG. 4 shows an alternative arrangement. A compact sensor 23 is arranged approximately at the center above the product 17. Two further compact sensors 23 are located beneath the product 17 at both sides and each detect the product contour obliquely from below.

FIG. 5 shows by way of example an arrangement in which two compact sensors 23 are provided which are arranged behind one another in the direction of movement of the product 17 and which are oriented opposite one another. Such an arrangement makes it possible to also detect such regions of products 17 having surfaces that are in particular shaped in a highly irregular manner at those surface regions which would not be visible by means of a single sensor 23.

A plurality of such double arrangements of compact sensors 23 can be arranged distributed around the product 17 in the peripheral direction.

REFERENCE NUMERAL LIST

10 slicing apparatus, slicer
11 cutting region
13 transport region
15 product feed
16 product abutment
17 product
19 cutting plane
20 axis of rotation
21 cutting blade
22 cutting head
23 compact sensor
24 drive axis
25 sensor housing
27 scanning region
29 transmitter, light source, laser

31 receiver, camera
33 scanning plane
35 support frame or rack
37 transfer device
39 product support
41 conveying device
43 conveying device
44 conveying device
45 product inlet region
47 inlet plane
49 product holder
51 control device
53 product slice
55 portion
57 optical axis
59 detection region
61 conveyor
63 cutting edge
65 portioning belt
67 conveyor belt
69 loading region
A scanning point
B scanning point
C scanning point
D scanning point

The invention claimed is:

1. An apparatus for slicing food products, comprising:
a product inlet region;
a working region comprising:
a cutting region, comprising:
a cutting plane at an end of the cutting region;
a cutting blade that moves in the cutting plane; and
a front product abutment upstream of the cutting plane and configured for abutment with a front end of a product to be sliced; and
a transport region between the product inlet region and the cutting region, the transport region having a product feed that supplies the product to be sliced to the cutting region on at least one track; and
a contactless contour scanner housed in a self-contained sensor housing and configured to detect at least a portion of an outer contour of the product to be sliced, the contactless contour scanner defining a scanning region for scanning the outer contour of the product to be sliced, the scanning region located in the working region and external to the self-contained sensor housing, the contactless contour scanner comprising:
a laser source for transmitting scanning radiation into the scanning region for scanning the product to be sliced; and
a camera for receiving radiation from the scanning region,
wherein the contactless contour scanner is located upstream or downstream of and proximate the front product abutment; and
a control device configured to receive, from the contactless contour scanner, contour data indicative of the outer contour of the product to be sliced and to control operation of the product feed based on the contour data to obtain product slices of constant weight.

2. The apparatus of claim 1, wherein the contactless contour scanner has a width of approximately 300 mm, a height between 60-80 mm, and a thickness of 40 mm.

3. The apparatus of claim 1,
wherein the laser source is configured to produce a light line on the product to be sliced, and
wherein the camera is configured to record an image including the light line.

4. The apparatus of claim 1, wherein the contactless contour scanner is supported or held at a support frame or a rack of the apparatus by which the cutting region and the transport region are also supported.

5. The apparatus of claim 1, wherein the contactless contour scanner is arranged at a spacing of approximately 5 to 20 mm upstream from the front product abutment.

6. The apparatus of claim 1, wherein a scanning plane of the contactless contour scanner extends at least substantially in parallel with or extends at an angle of less than approximately 45° to the cutting plane.

7. The apparatus of claim 1, wherein the transport region comprises a first conveyor adjacent to a second conveyor, and further comprising:
a second contactless contour scanner arranged in a transition region between the first conveyor and the second conveyor of the transport region.

8. The apparatus of claim 1, wherein the product inlet region comprises an inlet plane defined by a support frame or rack of the apparatus, and further comprising:
a second contactless contour scanner arranged in one of: the inlet plane, a first location upstream of and proximate the inlet plane, or a second location downstream of and proximate the inlet plane.

9. The apparatus of claim 1, wherein a plurality of different scanning positions is predefined for the contactless contour scanner in the working region, and wherein each of the different scanning positions differs with respect to a first position in a transport direction of the food products and/or with respect to a second position around the transport direction.

10. The apparatus of claim 9, wherein the contactless contour scanner is adjustable and/or is convertible between the different scanning positions.

11. The apparatus of claim 1,
wherein the product feed comprises at least two product tracks disposed in parallel along a transport direction of the apparatus, each of the at least two product tracks configured to transport a distinct product to the cutting blade, and
wherein the at least two product tracks are simultaneously covered by the contactless contour scanner such that the outer contour of the distinct product on each of the at least two product tracks is detected by the contactless contour scanner.

12. The apparatus of claim 1,
wherein the contactless contour scanner is one of a plurality of contactless contour scanners for a joint contour detection, wherein the plurality of contactless contour scanners is arranged at a common scanning point.

13. The apparatus of claim 1, wherein the contactless contour scanner is a first contactless contour scanner and further comprising:
at least one other contactless contour scanner,
wherein the scanning takes place in a manner offset in space and/or in time by the first contactless contour scanner and the at least one other contactless contour scanner at a scanning point.

14. The apparatus of claim 1, wherein the contactless contour scanner is a first contactless contour scanner and further comprising:
a second contactless contour scanner, wherein the scanning takes place by the first contactless contour scanner and the second contactless contour scanner oriented oppositely at a scanning point.

15. The apparatus of claim 1, wherein the contactless contour scanner scans a first portion of the product while a second portion of the product is being sliced, wherein the first portion is rearward from the second portion.

16. An apparatus for slicing food products, comprising:

a product inlet region;

a working region comprising:

a cutting region, comprising:

a cutting plane at an end of the cutting region;

a cutting blade that moves in the cutting plane; and a front product abutment upstream of the cutting plane and configured for abutment with a front end of a product to be sliced; and a transport region between the product inlet region and the cutting region, the transport region having a product feed that supplies the product to be sliced to the cutting region on at least one track, wherein the product feed comprises conveyor and a pivotable product support, the conveyor upstream from and adjacent the pivotable product support; and a first contactless contour scanner housed in a first self-contained sensor housing, and configured to detect at least a portion of an outer contour of the product to be sliced, the first contactless contour scanner defining a first scanning region for scanning the outer contour of the product to be sliced, the first scanning region located in the working region and external to the first self-contained sensor housing, the first contactless contour scanner comprising:

a first laser source for transmitting scanning radiation into the first scanning region; and a first camera for receiving radiation from the first scanning region;

wherein the first contactless contour scanner is arranged between the conveyor and the pivotable product support; and a second contactless contour scanner housed in a second self-contained sensor housing, the second contactless contour scanner defining a second scanning region and comprising:

a second laser source for transmitting scanning radiation into the second scanning region; and a second camera for receiving radiation from the second scanning region;

wherein the second contactless contour scanner is arranged upstream or downstream of and proximate the front product abutment; and a control device configured to receive, from at least one of the first contactless contour scanner or the second contactless contour scanner, contour data indicative of the outer contour of the product to be sliced and to control operations of the product feed based on the contour data to obtain product slices of constant weight.

17. An apparatus for slicing food products, comprising:

a product inlet region;

a working region comprising:

a cutting region, comprising:

a cutting plane at an end of the cutting region;

a cutting blade that moves in the cutting plane; and a front product abutment upstream of the cutting plane and configured for abutment with a front end of a product to be sliced; and a transport region between the product inlet region and the cutting region, the transport region having a product feed that supplies the product to be sliced to the cutting region on at least one track;

a product gripper configured to engage a rear of the product to be sliced while advancing the product to be sliced;

a first contactless contour scanner housed in a self-contained sensor housing and configured to detect at least a portion of an outer contour of the product to be sliced, the first contactless contour scanner defining a first scanning region for scanning the outer contour of the product to be sliced, the first scanning region located in the working region and external to the self-contained sensor housing, the first contactless contour scanner comprising:

a first laser source for transmitting scanning radiation into the first scanning region; and a first camera for receiving radiation from the first scanning region;

wherein the first contactless contour scanner is arranged upstream or downstream of and proximate the front product abutment; and a second contactless contour scanner arranged in the working region and comprising a second laser source and a second camera, the second contactless contour scanner configured to:

optically detect an orientation of the product gripper; and optically detect whether a residual piece of the product to be sliced is still located at the product gripper; and a control device configured to receive, from the first contactless contour scanner, contour data indicative of the outer contour of the product to be sliced and to control operations of the product feed based on the contour data to obtain product slices of constant weight.

18. An apparatus for slicing food products, comprising:

a product inlet region defining an inlet plane;

a working region comprising:

a cutting region, comprising:

a cutting plane at an end of the cutting region;

a cutting blade that moves in the cutting plane; and a front product abutment upstream of the cutting plane and configured for abutment with a front end of a product to be sliced; and a transport region between the product inlet region and the cutting region, the transport region having a product feed that supplies the product to be sliced to the cutting region on at least one track;

a first contactless contour scanner housed in a first self-contained sensor housing and configured to detect at least a portion of an outer contour of the product to be sliced, the first contactless contour scanner defining a first scanning region for scanning the product to be sliced, the first scanning region located in the working region and external to the first self-contained sensor housing, the first contactless contour scanner comprising:

a first laser source for transmitting scanning radiation into the first scanning region for scanning the product to be sliced; and a first camera for receiving radiation from the first scanning region, wherein the first contactless contour scanner is arranged proximate the inlet plane; and a second contactless contour scanner upstream or downstream of and proximate the front product abutment, the second contactless contour scanner comprising:
a second laser source for transmitting scanning radiation into a second scanning region for scanning the product to be sliced; and
a second camera for receiving radiation from the second scanning region; and
a control device configured to receive, from at least one of the first contactless contour scanner or the second contactless contour scanner, contour data indicative of the outer contour of the product to be sliced and to control operations of the product feed based on the contour data to obtain product slices of constant weight.

19. The apparatus of claim 1, further comprising:
a product gripper configured to engage a rear of the product to be sliced while advancing the product to be sliced to the cutting blade,
wherein the control device further controls the product gripper based on the contour data.

* * * * *